US008534484B2

(12) United States Patent
Rost et al.

(10) Patent No.: US 8,534,484 B2
(45) Date of Patent: Sep. 17, 2013

(54) SEALING COVER ASSEMBLY FOR AN UNDERGROUND UTILITY BOX

(75) Inventors: Kevin Rost, Oak Glen, CA (US); Hardy Rost, Cookville, TN (US)

(73) Assignee: Seahorse Industries Ltd., Las Vegas, NV (US)

( * ) Notice: Subject to any disclaimer, the term of this patent is extended or adjusted under 35 U.S.C. 154(b) by 895 days.

(21) Appl. No.: 12/578,427

(22) Filed: Oct. 13, 2009

(65) Prior Publication Data

US 2011/0084086 A1  Apr. 14, 2011

(51) Int. Cl.
B65D 53/02 (2006.01)

(52) U.S. Cl.
USPC .............................. 220/237; 220/484; 220/378

(58) Field of Classification Search
USPC .................... 220/233–238, 484, 378; 138/89
See application file for complete search history.

(56) References Cited

U.S. PATENT DOCUMENTS

| 634,381 | A |   | 10/1899 | Turner |   |
|---|---|---|---|---|---|
| 1,232,789 | A |   | 7/1917 | Gibson |   |
| 1,629,346 | A |   | 5/1927 | Larson |   |
| 2,625,731 | A |   | 1/1953 | Richmond |   |
| 3,392,228 | A |   | 7/1968 | Zerwes |   |
| 3,858,755 | A |   | 1/1975 | Tellen |   |
| 3,901,167 | A | * | 8/1975 | Reese | 109/64 |
| 4,303,101 | A | * | 12/1981 | Tholen | 138/89 |
| 4,648,740 | A |   | 3/1987 | Carlson |   |
| 5,010,957 | A |   | 4/1991 | Kenner |   |
| 5,044,403 | A | * | 9/1991 | Chen | 138/89 |
| 6,031,180 | A |   | 2/2000 | Schilling et al. |   |
| 6,505,839 | B1 |   | 1/2003 | Nishimuro et al. |   |
| 7,004,677 | B1 |   | 2/2006 | Ericksen et al. |   |
| 7,163,352 | B2 |   | 1/2007 | Jurich et al. |   |
| 2003/0178425 | A1 | * | 9/2003 | McKinnon | 220/254.3 |

FOREIGN PATENT DOCUMENTS

KR  20010016306  3/2011

OTHER PUBLICATIONS

International Search Report on corresponding PCT application (PCT/US2010/050570) from International Searching Authority (KIPO) dated Jun. 29, 2011.
Written Opinion on corresponding PCT application (PCT/US2010/050570) from International Searching Authority (KIPO) dated Jun. 29, 2011.

* cited by examiner

Primary Examiner — Anthony Stashick
Assistant Examiner — James N Smalley
(74) Attorney, Agent, or Firm — Klein, O'Neill & Singh, LLP

(57) ABSTRACT

A sealing cover assembly that provides a liquid-tight seal around the upper perimeter of an underground utility box includes an upper lid element, a lower lid element, and a resilient, elastomeric sealing element sandwiched in between. The sealing element includes a peripheral sealing lip that mates with a peripheral surface of the upper lid element, and a sealing flange that seats in a peripheral groove or slot in the lower lid element. The peripheral lip bears against an interior surface of the underground box to form a seal The underside of the lower lid element includes fastening elements for securing an accessory holder to the underside of the cover assembly. A central fastening assembly secures the upper and lower lid elements together with the sealing element captured therebetween.

17 Claims, 7 Drawing Sheets

SEALING COVER ASSEMBLY FOR AN UNDERGROUND UTILITY BOX

CROSS-REFERENCE TO RELATED APPLICATIONS

Not Applicable

FEDERALLY SPONSORED RESEARCH OR DEVELOPMENT

Not Applicable

BACKGROUND

The present disclosure relates to underground utility boxes and receptacles (sometimes called "vaults"), such as those used ie cable TV systems, telephone systems, electric utilities, and water utilities (such as, for example, irrigation systems). More specifically, it relates to a sealing cover assembly for use with an underground utility box or receptacle. Hereinafter, the term "utility box" will be used for simplicity, without limitation to the shape or configuration of the receptacle.

A typical underground utility box is placed within a hole in the ground so that only the top cover of the box is exposed. The utility box may contain a variety of different devices and instruments. For example, in a water utility application, the utility box may contain one or more valves and/or flow meters.

Many devices housed within an underground utility box are sensitive to water. Therefore, it is advantageous that the utility box resist water penetration. Further, a sealed utility box resists entry by rodents that may gnaw on electrical wiring within the box, and spiders that may present a danger to workers who open the box. Moreover, sealing against dirt, dust, and debris may also advantageously enhance reliability and reduce maintenance costs.

SUMMARY

The various embodiments of the present sealing cover assembly for an underground utility box have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description of the Preferred Embodiments," one will understand how the features of the present embodiments provide the advantages described herein.

One embodiment of the present sealing cover assembly comprises an upper lid element having a convexly curved peripheral sealing surface; a lower lid element having an upwardly-facing peripheral groove; and a resilient sealing element sandwiched between the upper and lower elements. The sealing element advantageously comprises a flat sheet having around its outer edge a downwardly-extending flange configured to seat within the groove, and an upwardly-extending flange having a concavely curved surface configured to receive the convexly curved sealing surface on the upper element. A liquid-tight seal is provided by the engagement of the sealing element between the upper and lower lid elements.

BRIEF DESCRIPTION OF THE DRAWINGS

The various embodiments of the present sealing cover assembly will be discussed in detail with an emphasis on highlighting the advantageous features. These embodiments are depicted in the accompanying drawings, which are for illustrative purposes only. These drawings include the following figures, in which like numerals indicate like parts.

DETAILED DESCRIPTION

Figure 1:
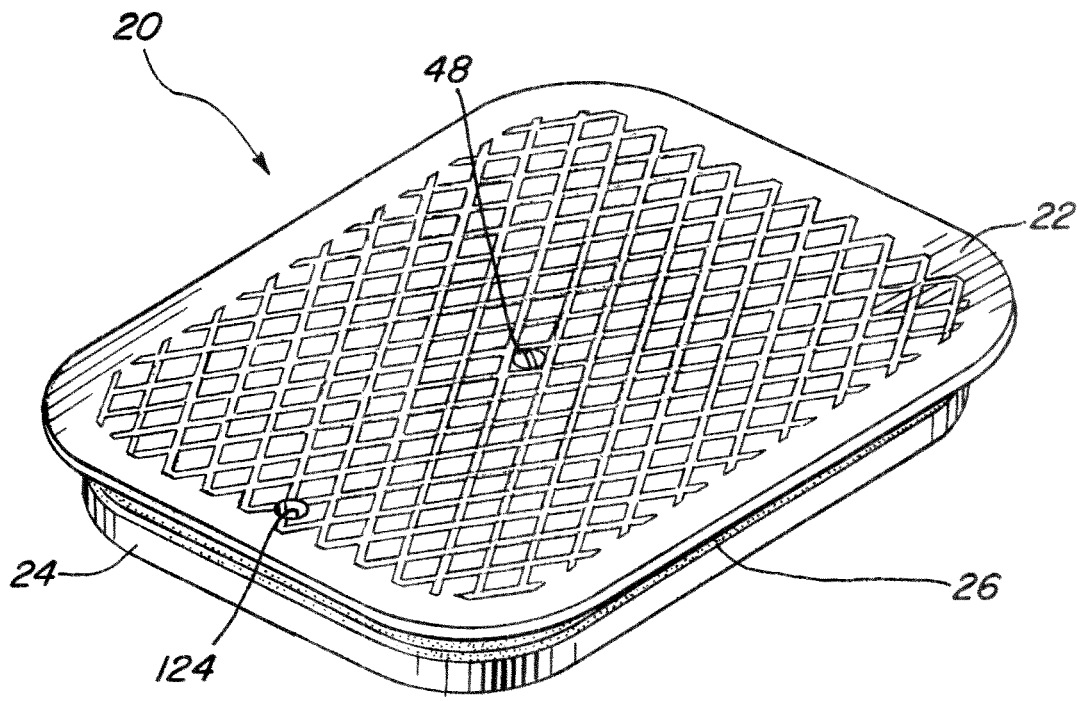
FIG. 1 is a top perspective view of one embodiment of the present sealing cover assembly for an underground utility box.
Figure 2:
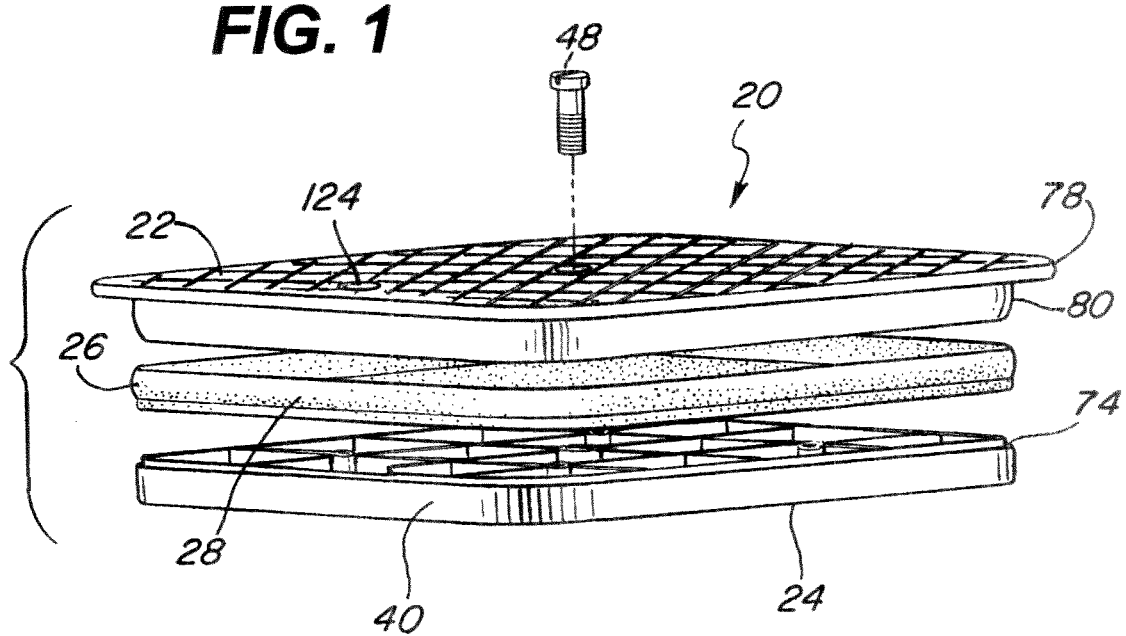
FIG. 2 is an exploded front perspective view of the sealing cover assembly of FIG. 1.
Figure 3:
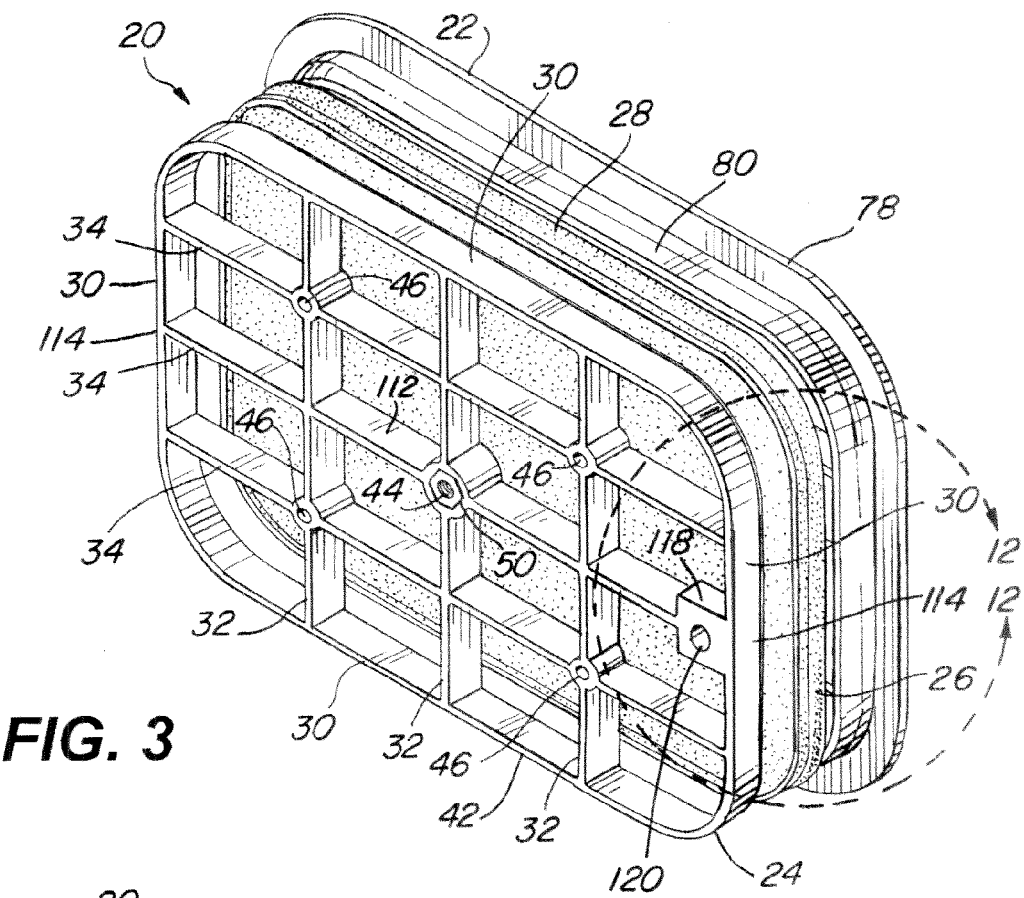
FIG. 3 is an exploded bottom perspective view of the sealing cover assembly of FIG. 1.

FIGS. 1-12 illustrate one embodiment of the present sealing cover assembly 20 for an underground utility box. FIGS. 2 and 3 illustrate components of the sealing cover assembly 20 exploded for clarity. The illustrated embodiment includes an upper lid element 22, a lower lid element 24, and a sealing element or gasket 28 sandwiched between the upper and lower lid elements 22, 24. The sealing element 26 is a flat sheet having a thickened outer peripheral edge 28, which is described in further detail below. The sealing element 26 may be made of any suitable material that is resilient and elastomeric, such as, for example, ethylene propylene diene monomer (EPDM) rubber, fluoropolymer elastomers (such as that marketed by DuPont Performance Elastomers under the mark VITON®). Buna N (nitrile) rubber (copolymer of butadiene and acrylonitrile) or neoprene, with Buna N rubber being preferred. The upper and lower lid elements 22, 24 are constructed of a durable, weather-resistant material that is capable of withstanding prolonged outdoor exposure. Plastics are preferred since they do not corrode and are typically lightweight. Examples of preferred materials include high-density polyethylene (HDPE) or UV-stabilized polyvinyl chloride (UV-PVC), with HOPE being preferred.

With particular reference to FIG. 3, the lower lid element 24 advantageously includes an outer peripheral frame 30 that supports a grid work comprising a plurality of intersecting slats 32, 34. In the illustrated embodiment, the frame 30 is substantially rectangular and has rounded corners, but this configuration is only one example and not limiting. Also in the illustrated embodiment, the grid work comprises three parallel lateral slats 32 and three parallel longitudinal slats 34 intersecting the lateral slats 32 at right angles. Again, it will be appreciated that the number and configuration of the slats 32, 34 are exemplary only and not limiting, With continued reference to FIG. 3, the lower lid element 24 further has a center aperture 44 and a plurality of outer apertures 46 located at certain intersections of the slats 32, 34. The center aperture 44 is located at the intersection of a central one of the lateral slats 32 and a central one of the longitudinal slats 34. Each of the apertures 44, 46 is oriented such that its longitudinal axis extends perpendicular to a plane defined by the lower lid element 24. Further, in the areas of the apertures 44, 46, each corner of each intersecting slat is convexly rounded. Thus, the apertures 44, 46 take the form of hollow center portions of cylinders located at the indicated intersections. As described below, the center aperture 44 is configured to receive fastening members that secure the upper and lower lid elements 22, 24 together, while the outer apertures 46 are configured to receive fastening members that secure an accessory holder 88 (FIGS. 10 and 11) to the sealing cover assembly 20.

Figure 4:
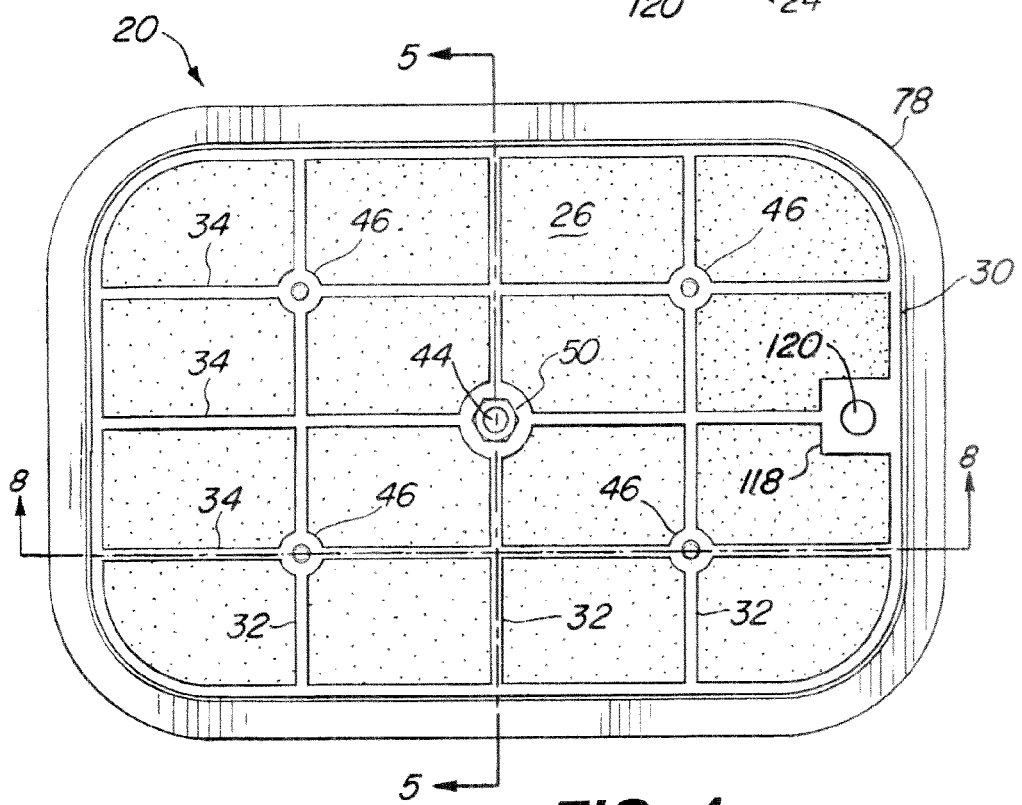
FIG. 4 is a bottom plan view of the sealing cover assembly of FIG. 1.
Figure 5:
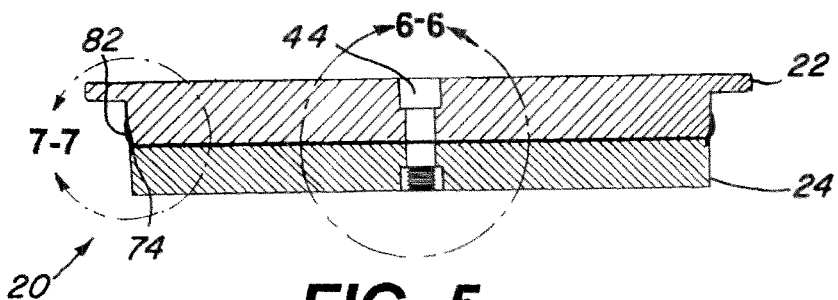
FIG. 5 is a cross-sectional view taken through the line 5-5 in FIG. 4.
Figure 6:
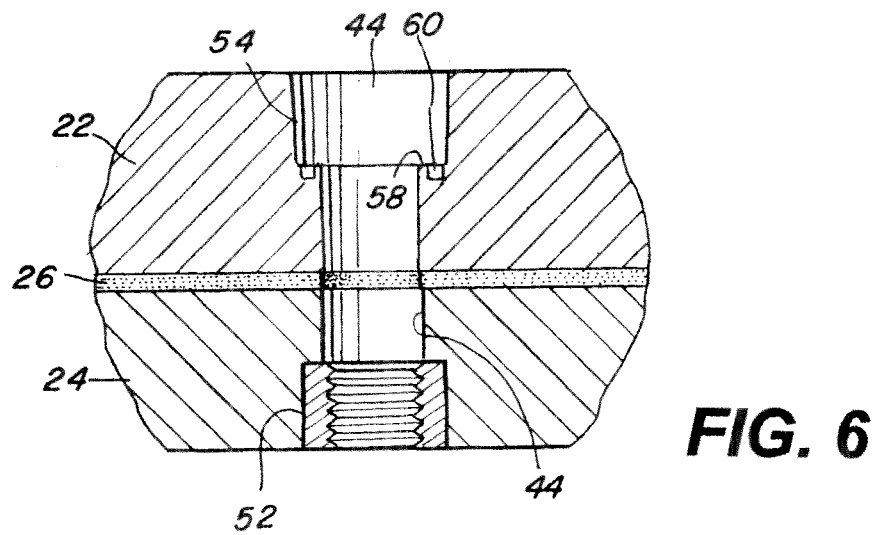
FIG. 6 is a detail view of the portion of the sealing cover assembly indicated by the circle 6-6 in FIG. 5.
Figure 6A:
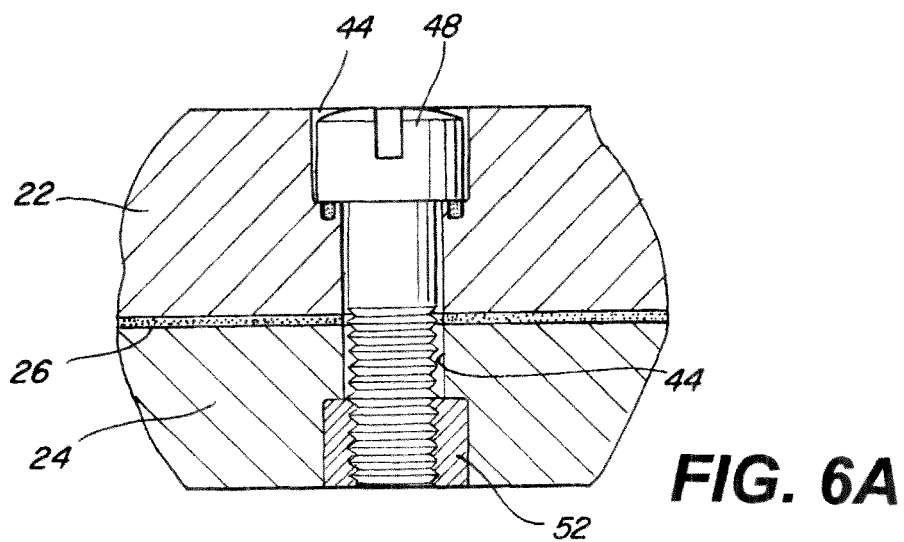
FIG. 6A is a detail view similar to that of FIG. 6, but also illustrating a bolt securing the components of the sealing cover assembly to each other.

FIG. 5 illustrates a cross-sectional view of the assembled sealing cover assembly 20, as viewed along the section line 5-5 in FIG. 4. FIGS. 6 and 6A are detail views of the portion encompassed by the circle 6-6 in FIG. 5. With reference to FIG. 6, the center aperture 44 passes through the upper lid element 22, the sealing element 26, and the lower lid element 24. The center aperture 44 is advantageously configured to hold a fastener, such as a screw 48 (or, alternatively, a threaded bolt) and a nut 50, as shown in FIG. 6A. The screw 48 (or bolt) and the nut 50 comprise a fastening assembly that holds the upper lid element 22, the sealing element 26, and the lower lid element 24 together.

Specifically, with reference to FIG. 6, the center aperture 44 includes an enlarged-diameter lower portion 52 in the lower lid element 24, and an enlarged-diameter upper portion 54 in the upper lid element 22. The nut 50 is held in the lower portion 52 of the center aperture 44. In certain embodiments, the nut 50 may be co-molded with the lower lid element 24. The upper portion 54 of the center aperture 44 in the upper lid element 22 receives the screw head, with the shank of the screw 48 extending through the center aperture 44 into the lower portion 52 thereof for engagement with the nut 50. The transition between the enlarged-diameter upper portion 54 of the center aperture 44 and the main portion thereof forms an annular shoulder 58 against which the screw head bears. The shoulder 58 includes an annular groove 60 that is configured to receive a seal, such as an O-ring 62, illustrated in FIG. 6A. When the screw 48 is tightened into the nut 50, the screw head bears against the O-ring 62, creating a liquid-tight seal at the shoulder 58.

It will be appreciated that the illustrated configuration for the center aperture 44 is only one example, and not limiting. Those of ordinary skill in the art will further appreciate that the sealing element 26 may either be pre-formed with a hole corresponding to the center aperture 44, or it may be formed of a material and with a thickness that permits it to be easily punctured by the passage of the screw 48 through It.

Figure 8:
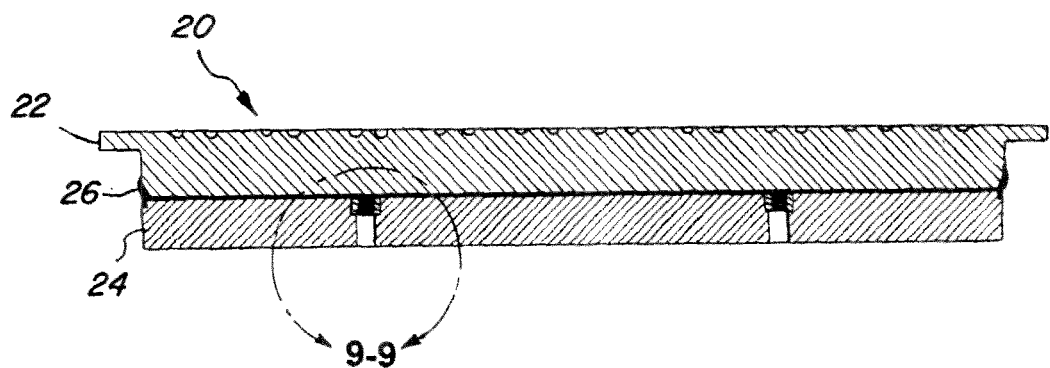
FIG. 8 is a cross-sectional view taken through the line 8-8 in FIG. 4.
Figure 9:
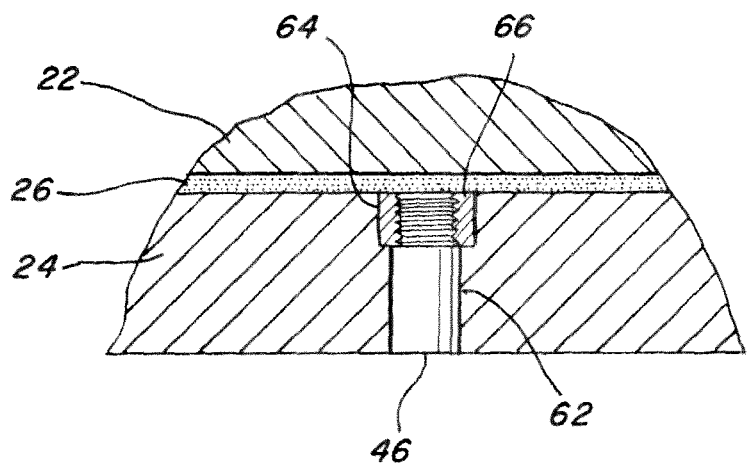
FIG. 9 is a detail view of the portion of the sealing cover assembly indicated by the circle 9-9 in FIG. 8.

FIG. 8 illustrates a cross-sectional view of the assembled sealing cover 20, as viewed along the section line 8-8 in FIG. 4. FIG. 9 illustrates a detail view of FIG. 8, indicated by the circle 9-9 in FIG. 8. With reference to FIG. 9, each of the outer apertures 46 passes through only the lower lid element 24. Each outer aperture 46 terminates in an enlarged-diameter upper portion 64 adjacent the sealing element 26. The upper portion 64 holds a threaded fastening member, which in the illustrated embodiment is a nut 66. In certain embodiments the nut 66 may be co-molded with the lower lid element 24. It will be appreciated that the illustrated configuration for the outer apertures 46 is only one example. In alternative embodiments, for example, the outer apertures 46 may be of constant diameter, without an enlarged-diameter portion.

Figure 11:
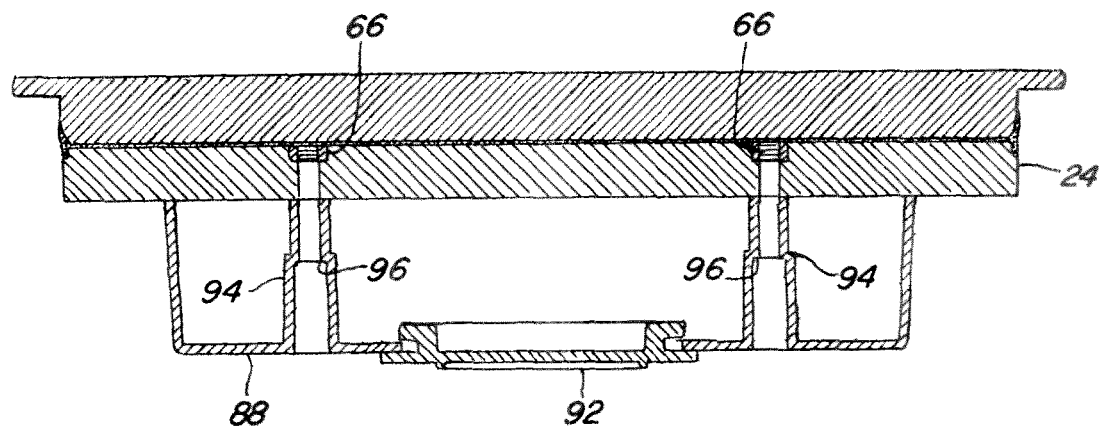
FIG. 11 is a cross-sectional view of the sealing cover assembly and the accessory holder of FIG. 10.
Figure 10:
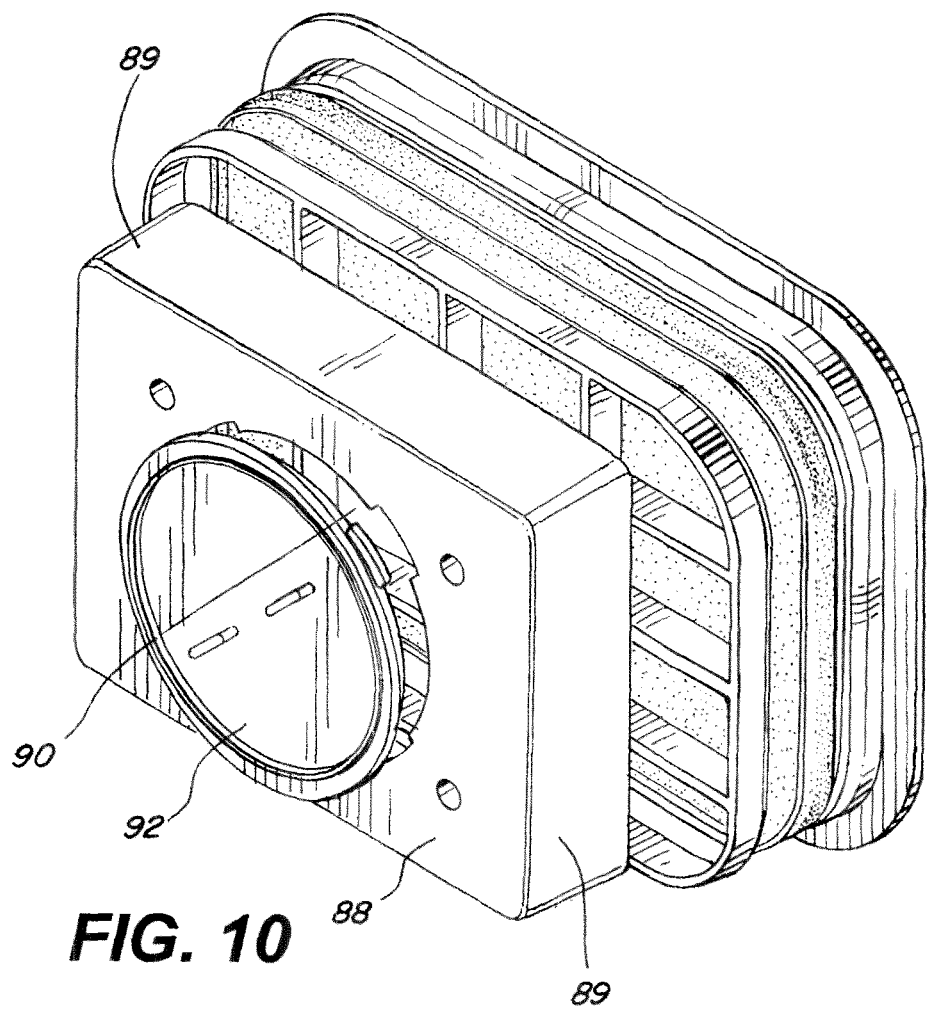
FIG. 10 is an exploded bottom perspective view of the sealing cover assembly of FIG. 1 in combination with an accessory holder.

With reference to FIGS. 9-11, the outer apertures 46 are configured screws or threaded bolts (not shown) that engage the nuts 66. The screws or bolts accessory holder 88 to the lower lid element 24. In the illustrated embodiment, the holder 88 is a tray having sidewalk 89 and a central opening 90. A removable lid 92 opening 90. In alternative embodiments the accessory holder 88 may take another form, such as a platform, or a receptacle. The accessory holder 88 may hold, for example, water meters (in an irrigation or water supply system), junction boxes (in an electrical system), or any other device or apparatus that is appropriate for installation, in an underground box that may be used for any particular system.

With reference to FIG. 11, a plurality of stepped cylindrical passages 94 extend upward from the lower surface of the accessory holder 88. The passages 94 align with the four outer apertures 46 in the lower lid element 24, and they are configured to receive threaded fastening members, such as screws or bolts (not shown). The screws engage the nuts 66 in the lower lid element 24, with a head of each screw bearing against an annular shoulder 96 to secure the accessory holder 88 to the lower lid element 24.

Figure 7:
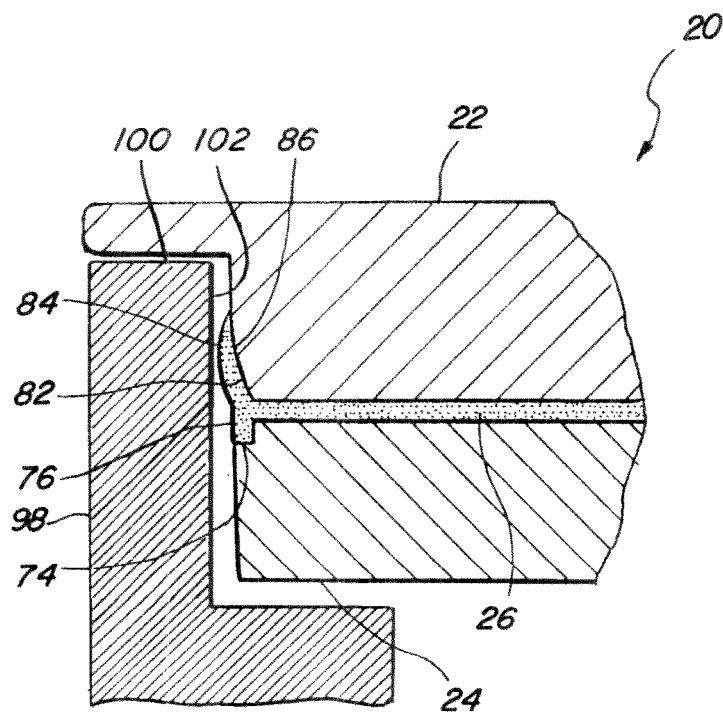
FIG. 7 is a detail view of the portion of the sealing cover assembly indicated by the circle 7-7 in FIG. 5.

FIGS. 2 and 5 show that the lower lid element 24 includes a slot or groove 74 extending around its upper periphery. As best shown in FIG. 7, the slot or groove 74 may advantageously have a substantially rectangular cross-section. The slot or groove 74 receives a downward extending flange 76 that encircles the periphery of the sealing element 26, as discussed in further detail below.

With reference to FIGS. 2 and 3, the upper lid element 22 includes a substantially solid top plate 78 having a frame 80 extending from a lower surface thereof. The frame 80 is sized and shaped similarly to the frame 30 of the lower lid element 24. The top plate 78 is preferably somewhat larger than the frame 80, so that it extends outwardly past the perimeter of the frame 80 on all sides. A grid work of intersecting longitudinal and lateral slats (not shown) is formed within the frame 80. The slats are advantageously sized, shaped and positioned to overlie the slats 32, 34 in the lower lid element 24 when the lid elements 22, 24 and the sealing element 26 are secured together.

With reference to FIGS. 5 and 6, the frame 80 of the upper lid element 22 includes a convexly curved outer surface 82. The sealing element 26 includes an upwardly extending peripheral sealing lip 84. The lip 84 includes a concavely curved inner surface 86 that mates with and seals against the convexly curved outer surface 82 of the upper lid element frame 80. With its lower flange 76 seated in the peripheral slot or groove 74 in the lower lid element frame 30, and the upper lip 84 sealing against the outer surface 82 of the upper lid element frame 80, the sealing element 26 forms a liquid-tight seal around the peripheries of the upper and lower lid elements 22, 24.

Figure 7A:
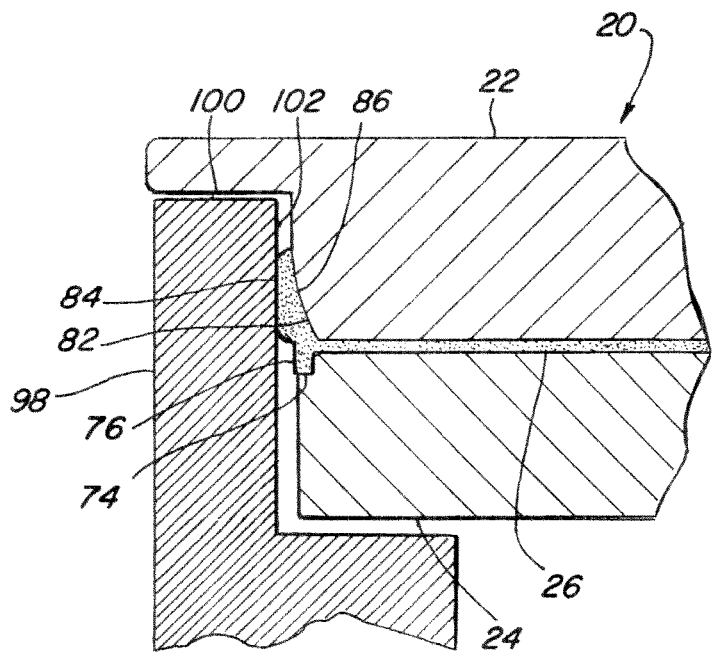
FIG. 7A is a detail view similar to that of FIG. 7, but illustrating the gasket in an expanded configuration.

When the sealing cover assembly 20 is secured to an underground utility box 98. the lower lid element 24, the sealing element 26, and the frame 80 on the upper lid element 22 are received within an upper opening in the box 98, as shown in FIG. 7. The top plate 78 of the upper lid element 22 rests against an upwardly facing edge 100 of the box 98. The box 98 and the sealing cover assembly 20 are dimensioned so that when the sealing cover assembly 20 is initially placed in the box 98 the sealing element 26 is spaced slightly from, or bears tightly against the box interior surface 102 just below the upper edge of the box 100. The sealing element 26, however, comprises an expansion gasket. When the screw 48 is tightened in the nut 50 (FIGS. 5 and 6A), the sealing element 26 is squeezed between the upper and lower lid elements 22, 24. The squeezing forces the elastomeric material of the sealing element 26 to bulge outwardly in the area of the peripheral sealing lip 84. The bulging sealing lip 84 bears firmly against the box interior surface 102 just below the upper edge of the box 98, as shown in FIG. 7A. The firm contact between the sealing lip 84 and the box interior surface 102 creates a seal that resists entry of water, dust, debris, rodents, spiders, etc. into the interior of the box 98.

The following description recites a method of securing the present sealing cover assembly 20 to a utility box 98. With the box 98 uncovered, the operator begins with the sealing cover assembly 20 in a state in which the screw 48 is withdrawn sufficiently from the nut 50 that the sealing lip 84 is not bulging outwardly to an extent that would prevent the assembly 20 from being inserted into the open top of the box 98. The operator then positions the assembly 20 in the open box 98 so that the top plate 78 rests on the upper edges 100 of the sidewalk of the box 98. In this configuration, the frame 80, the sealing member 26 and the lower lid element 24 are positioned inside the upper portion of the box 98. The operator next tightens the screw 48 into the nut 50. As the screw tightens 48, the sealing lip 84 bulges outwardly to create the seal as described above. The seal creates a friction force between the sealing cover assembly 20 and the box that retains the assembly 20 in place.

FIGS. 1-4 illustrate another advantageous feature of the present sealing cover assembly 20. As shown in FIGS. 3, and 4, a juncture 118 between the central longitudinal slat 34 one of the two opposed shorter sides 114 of the lower lid element 24 is widened to accommodate a first aperture 120 that extends through the lower lid element 24 in a direction perpendicular to a plane defined by the lower lid element 24. With reference to FIGS. 1 and 2. a second aperture 124 passes through the upper lid element 22 and is coaxial with the first aperture 120 in the lower lid element 24.

Figure 12:
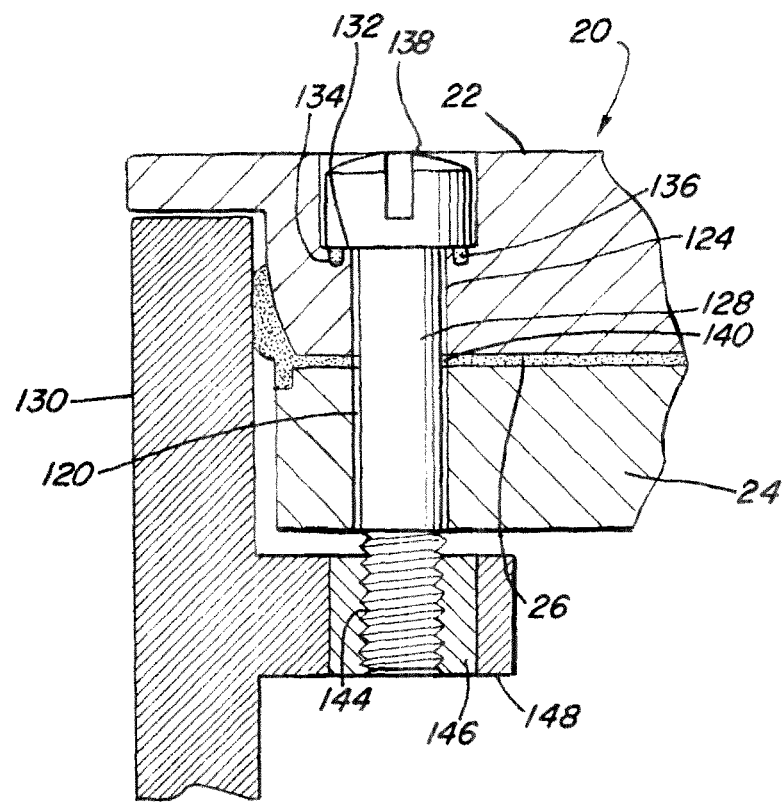
FIG. 12 is a detail view of the portion of the sealing cover assembly indicated by the circle 12-12 in FIG. 3.

FIG. 12 illustrates a detail cross-sectional view of the portion of the lid assembly 20 that includes the apertures 120, 124, as indicated by the circle 12-12 in FIG. 3, The apertures 120, 124 are configured to receive a threaded fastening member, such as a screw 128 or a bolt, for securing the sealing cover 110 to an underground utility box 130. The second aperture 124 in the upper lid element 22 includes an annular shoulder 132. The shoulder 132 includes a circular groove 134 that receives a sealing member, such as an O-ring 136. A head 138 of the screw 128 bears against the O-ring 136 to provide a liquid tight, seal about the second aperture 124. The screw 128 passes through an opening 140 in the sealing element 26. At least a lower end of the screw 128 includes threads 144 that engage a nut 146 in a ledge 148 of the underground utility box 130. Tightening the screw 128 into the nut 146 secures the cover 20 to the ledge 148, strengthening the securement of the cover 20 to the box 130.

The above description presents the best mode contemplated for carrying out the present sealing cover assembly for an underground box, and of the manner and process of making and using it, in such full, clear, concise, and exact terms as to enable any person skilled in the art to which it pertains to make and use this sealing cover. This sealing cover assembly is, however, susceptible to modifications and alternate constructions from that discussed above that are fully equivalent. Consequently, this disclosure is not limited to the particular embodiments described and illustrated herein. On the contrary, this disclosure encompasses all modifications and alternate constructions coming within the spirit and scope of the following claims, which particularly point out and distinctly claim the subject matter of this disclosure.

What is claimed is:

1. A sealing cover assembly for a utility box, the sealing cover assembly comprising:
    an upper lid element having a lower periphery with a convexly curved outer surface, wherein the upper lid element comprises a substantially solid plate having a frame extending from a lower surface thereof, and wherein the plate has a first perimeter and the frame has a second perimeter smaller than the first perimeter;
    a lower lid element having an upper periphery with a peripheral slot;
    a resilient, elastomeric sealing element sandwiched between the upper and lower lid elements, the sealing element having a peripheral edge with a downwardly extending flange configured to seat within the slot and an upwardly extending lip having an inner surface configured to receive the convexly curved surface on the lower periphery of the upper lid element; and
    first and second apertures passing through the upper and lower lid elements and configured to receive a fastening member for securing the assembly to the utility box.

2. The sealing cover assembly of claim 1, further comprising a fastening assembly configured to secure the upper and lower lid elements together with the sealing element sandwiched in between.

3. The sealing cover assembly of claim 2, wherein the fastening assembly is operable to squeeze the sealing element between the upper and lower lid elements, thereby causing at least the upwardly extending lip to bulge outwardly.

4. The sealing cover assembly of claim 1, wherein the lower lid element comprises an outer frame supporting a plurality of intersecting slats.

5. The sealing cover assembly of claim 1, further comprising:
    an accessory holder configured to be securable to the lower lid element; and
    at least one integrated threaded fastening member in the lower lid element configured to secure the accessory holder to the lower lid element.

6. The sealing cover assembly of claim 1, wherein the lower surface of the plate inside the frame is configured with a plurality of intersecting slats.

7. A method of securing a sealing cover assembly on a utility box, the method comprising:
    assembling a sealing cover assembly by securing an upper lid element having a convexly curved surface around its lower periphery to a lower lid element having a slot extending around its upper periphery with a resilient, elastomeric sealing element sandwiched between the upper and lower lid elements, wherein the upper lid element has a first aperture and the lower lid element has a second aperture, the first and second apertures being configured to receive a fastening member, wherein the upper lid element comprises a substantially solid plate having a frame extending from a lower surface thereof, and wherein the plate has a first perimeter and the frame has a second perimeter smaller than the first perimeter; and
    securing the sealing cover assembly to the utility box using a fastening member passing through the first and second apertures;
    wherein the sealing element has an outer edge with a downwardly extending flange that seats within the slot and an upwardly extending lip having a concavely curved surface that receives the convexly curved surface on the upper lid element.

8. The method of claim 7, wherein the upper and lower lid elements are fastened together with a fastening assembly, the method further comprising tightening the fastening assembly so as to squeeze the sealing element between the lid elements, thereby causing at least the upward extending lip to bulge outwardly.

9. The method of claim 7, wherein the lower lid element comprises an outer frame supporting a plurality of intersecting slats.

10. The method of claim 7, wherein the lower surface of the plate inside the frame is configured with a plurality of intersecting slats.

11. A sealing cover assembly for a utility box, the sealing cover assembly comprising:
    an upper lid element having a lower periphery with a convexly curved outer surface;
    a lower lid element having an upper periphery with a peripheral slot;
    a resilient, elastomeric sealing element sandwiched between the upper and lower lid elements, the sealing element having a peripheral edge with a downwardly extending flange configured to seat within the slot and an upwardly extending lip having an inner surface configured to receive the convexly curved surface on the lower periphery of the upper lid element;
    first and second apertures passing through the upper and lower lid elements and configured to receive a fastening member for securing the assembly to the utility box;
    an accessory holder configured to be securable to the lower lid element; and
    at least one integrated threaded fastening member in the lower lid element configured to secure the accessory holder to the lower lid element.

12. The sealing cover assembly of claim 11, further comprising a fastening assembly configured to secure the upper and lower lid elements together with the sealing element sandwiched in between.

13. The sealing cover assembly of claim 12, wherein the fastening assembly is operable to squeeze the sealing element between the upper and lower lid elements, thereby causing at least the upwardly extending lip to bulge outwardly.

14. The sealing cover assembly of claim 11, wherein the lower lid element comprises an outer frame supporting a plurality of intersecting slats.

15. The sealing cover assembly of claim 11, wherein the upper lid element comprises a substantially solid plate having a frame extending from a lower surface thereof.

16. The sealing cover assembly of claim 15, wherein the plate has a first perimeter and the frame has a second perimeter smaller than the first perimeter.

17. The sealing cover assembly of claim 11, wherein the lower surface of the plate inside the frame is configured with a plurality of intersecting slats.

* * * * *